US012580873B2

(12) United States Patent
Sun et al.

(10) Patent No.: US 12,580,873 B2
(45) Date of Patent: Mar. 17, 2026

(54) EFFICIENT CHANNEL ALLOCATION METHOD

(71) Applicant: Beken Corporation, Shanghai (CN)

(72) Inventors: Qiang Sun, Shanghai (CN); Feixi Liang, Shanghai (CN); Xueli Lyu, Shanghai (CN); Guochu Chen, Shanghai (CN)

(73) Assignee: Beken Corporation, Shanghai (CN)

( * ) Notice: Subject to any disclaimer, the term of this patent is extended or adjusted under 35 U.S.C. 154(b) by 132 days.

(21) Appl. No.: 18/614,030

(22) Filed: Mar. 22, 2024

(65) Prior Publication Data

US 2025/0274402 A1     Aug. 28, 2025

(30) Foreign Application Priority Data

Feb. 28, 2024     (CN) .......................... 202410225062.6

(51) Int. Cl.
| *G06F 15/173* | (2006.01) |
| *G16Y 40/30* | (2020.01) |
| *H04L 47/80* | (2022.01) |

(52) U.S. Cl.
CPC ............ H04L 47/805 (2013.01); G16Y 40/30 (2020.01)

(58) Field of Classification Search
CPC ............. H04L 47/805; H04W 72/542; H04W 72/566; G16Y 40/30; G16Y 40/35; G16Y 40/40; G16Y 40/50
See application file for complete search history.

(56) References Cited

U.S. PATENT DOCUMENTS

| 2005/0086404 | A1* | 4/2005 | Weber | .................. | H04L 47/525 |
| | | | | | 710/244 |
| 2010/0309845 | A1* | 12/2010 | Jeon | ...................... | H04W 74/02 |
| | | | | | 370/328 |
| 2016/0164784 | A1* | 6/2016 | Amemiya | ............... | H04L 47/29 |
| | | | | | 709/235 |
| 2021/0337409 | A1* | 10/2021 | Xue | ................. | H04W 52/0216 |
| 2024/0137979 | A1* | 4/2024 | Kim | ........................ | H04L 69/28 |
| 2025/0262484 | A1* | 8/2025 | Meckenzie | ........... | G16H 20/30 |

* cited by examiner

*Primary Examiner* — Yves Dalencourt
(74) *Attorney, Agent, or Firm* — Schwegman Lundberg & Woessner, P.A.

(57) ABSTRACT

The present disclosure provides system and methods for allocating the schedule period among multiple channels. The method includes receiving a first signal from a first channel and receiving a second signal from a second channel. The first signal includes a first communication request and the second signal includes a second communication request. The method includes determining a first priority degree corresponding to the first communication request and a second priority degree corresponding to the second communication request, estimating a first data flow in the first signal over a schedule period and a second data flow in the second signal over the schedule period, and allocating the schedule period to the first channel and the second channel based on the first priority degree, the second priority degree, the estimated first data flow, and the estimated second data flow.

17 Claims, 13 Drawing Sheets

EFFICIENT CHANNEL ALLOCATION METHOD

CROSS REFERENCE TO RELATED APPLICATION

This application claims priority to and incorporates by reference Chinese patent application no. 202410225062.6 filed 28 Feb. 2024.

TECHNICAL FIELD

The present disclosure generally relates to channel allocation. In particular, example embodiments of the present disclosure address systems and methods for efficiently allocating a schedule period among multiple channels of an Internet of Things (IoT) device.

BACKGROUND

An Internet of Things (IoT) system includes a network of physical objects, often referred to as "smart devices" or "IoT devices." These devices are equipped with embedded sensors, software, and other technologies that facilitate connection and data exchange with other devices via networks (e.g., Wi-Fi, Internet). For example, the IoT devices are used in home automation to control lighting, heating and air conditioning, media and security systems, and camera systems.

Within an IoT system, there exist scenarios where a device can simultaneously operate under multiple identities, such as Stations, Access Points (AP), and candidates in Peer-to-Peer (P2P) connections. For instance, a mobile device might function as a Station while concurrently establishing a P2P connection with another device. Specifically, a mobile device may share its screen with a TV while maintaining a connection with an AP over a WI-FI network.

For a multi-identity device possessing a single radiofrequency (RF) transceiver, it typically utilizes different channels for each identity and switches among them based on the identity in use. Thus, enhancing the efficiency of these channels, such as data transmission and channel usage, is crucial for improving the device's overall working efficiency.

SUMMARY

In one aspect, a method is provided. The method includes receiving a first signal from a first device through a first channel of an IoT device and receiving a second signal from a second device through a second channel of the IoT device. The first signal includes a first communication request and the second signal includes a second communication request. The method further includes determining a first priority degree corresponding to the first communication request and a second priority degree corresponding to the second communication request, estimating a first data flow in the first signal over a schedule period and a second data flow in the second signal over the schedule period, and allocating the schedule period to the first channel and the second channel based on the first priority degree, the second priority degree, the estimated first data flow, and the estimated second data flow. The method further includes receiving data from or transmitting data to the first channel and the second channel based on the allocation of the schedule period.

In another aspect, an IoT device is provided. The IoT device includes a processor and a memory. The memory stores instructions that, when executed by the processor, configure the IoT device to receive a first signal from a first device through a first channel of the IoT device and receive a second signal from a second device through a second channel of the IoT device. The first signal includes a first communication request and the second signal includes a second communication request. The instructions further configure the IoT device to determine a first priority degree corresponding to the first communication request and a second priority degree corresponding to the second communication request, estimate a first data flow in the first signal over a schedule period and a second data flow in the second signal over the schedule period, and allocate the schedule period to the first channel and the second channel based on the first priority degree, the second priority degree, the estimated first data flow, and the estimated second data flow. The instructions further configure the IoT device to receive data from or transmit data to the first channel and the second channel based on the allocation of the schedule period.

In another aspect, a non-transitory computer-readable storage medium is provided. The computer-readable storage medium includes instructions that when executed by a computer, cause the computer to receive a first signal from a first device through a first channel of an IoT device and to receive a second signal from a second device through a second channel of the IoT device. The first signal includes a first communication request and the second signal includes a second communication request. The instructions further cause the computer to determine a first priority degree corresponding to the first communication request and a second priority degree corresponding to the second communication request, estimate a first data flow in the first signal over a schedule period and a second data flow in the second signal over the schedule period, and allocate the schedule period to the first channel and the second channel based on the first priority degree, the second priority degree, the estimated first data flow, and the estimated second data flow. The instructions further cause the computer to receive data from or transmit data to the first channel and the second channel based on the allocation of the schedule period.

BRIEF DESCRIPTION OF THE DRAWINGS

To easily identify the discussion of any particular element or act, the most significant digit or digits in a reference number refer to the figure number in which that element or act is first introduced.

DETAILED DESCRIPTION

Figure 1:
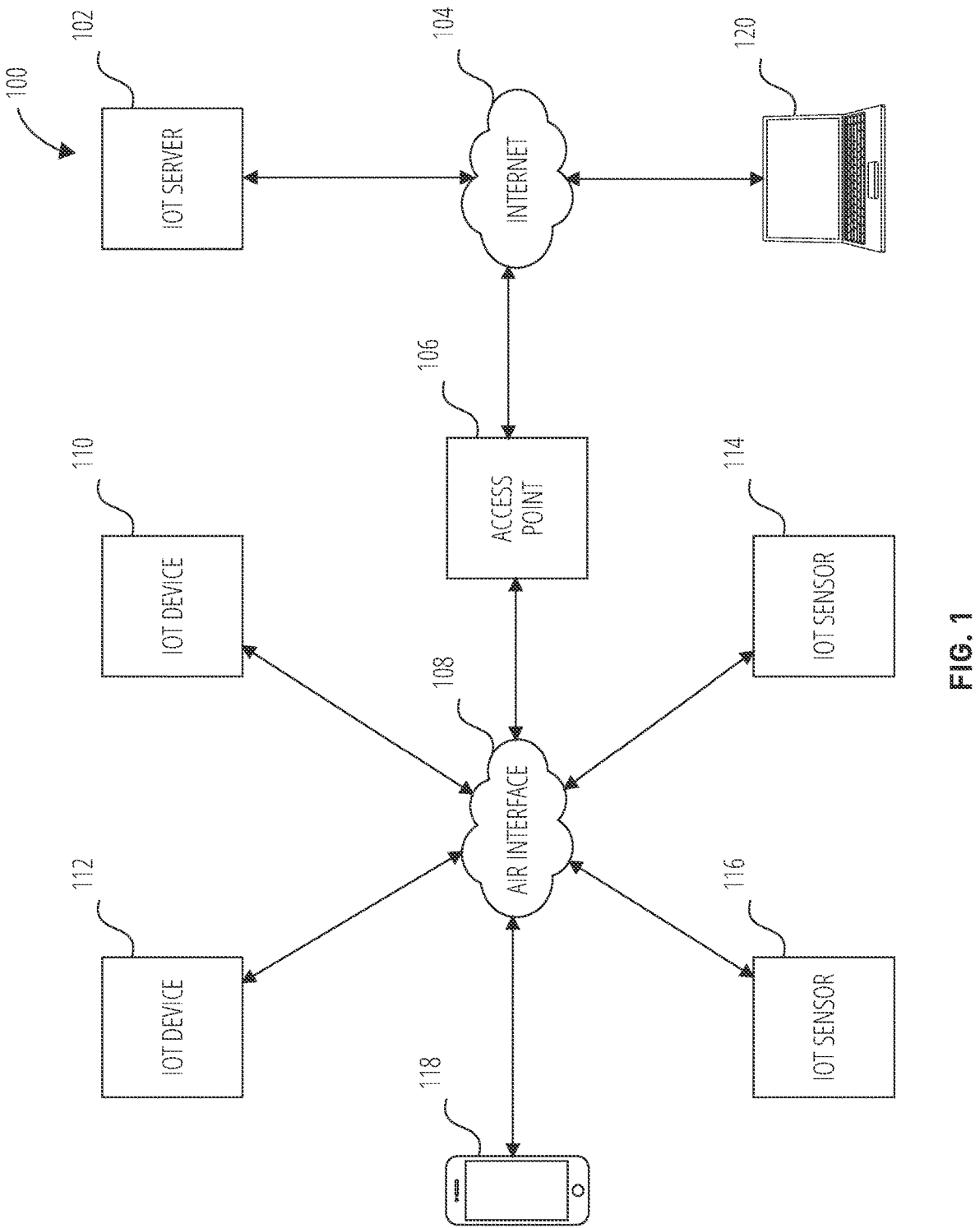
FIG. 1 is a block diagram illustrating an internet of things (IoT) system, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned above, a multi-identity device with a single radiofrequency (RF) transceiver uses different channels for different identities and switches among the channels based on the identity in use. In order to improve the efficiency of the channels (e.g., data transmission, channel usage) and the overall working efficiency of the device, it is important to efficiently allocate the schedule period among the channels.

One strategy is to allocate the schedule period equally among the different channels. While functional, this strategy can often be suboptimal. For instance, if one channel contains significantly more data than another, this allocation method could lead to inefficient utilization of channel capacity and a reduction in the device's overall working efficiency.

Another strategy is to allocate the scheduling period according to the data size in each channel. This strategy performs well when multiple channels contain equally or similarly important data but fails when one channel has considerably more important but smaller data (e.g., Beacon signals) than the other(s). In such a situation, the channel with important data is not allocated enough time to transmit or receive the data completely.

The present disclosure provides systems and methods for efficiently allocating the schedule period among multiple channels. Firstly, at least a part of the schedule period is pre-allocated (or reserved) for channels with a higher priority degree. The remaining time of the schedule period is then allocated among all the channels based on their estimated data sizes. In general, channel switching takes time. Accordingly, channel switching time needs to be considered and reserved or deducted from the schedule period. For the purpose of illustration, it may be assumed that the channel switching time has been reserved or deducted from the schedule period T in the present disclosure. In other words, the entire schedule period in the present disclosure is allocable, unless stated otherwise. Considering that initiating and completing a communication (e.g., transmitting or receiving a data packet) require a certain time duration, a minimum time duration may be imposed on each channels after switching to ensure that each communication after switching is meaningful. In some examples, the minimum time duration refers to a predetermined threshold (e.g., 5 TUs) required to completely transmit or receive a data packet. Alternatively, or additionally, the minimum time duration refers to the channel switching time mentioned above. It should be noted that the schedule period itself should be greater than or equal to the minimum time duration. If not, the schedule period may be redetermined or allocated directly to the channel with higher priority degree or higher data size, the channel in preceding schedule period, or the channel in succeeding schedule period. When a channel with a higher priority degree is pre-allocated a time duration shorter than the minimum time duration, the channel is instead pre-allocated the minimum time duration.

Similarly, when a remaining time of the schedule period after pre-allocation is less than the minimum time duration, the whole schedule period is allocated to the channel with higher priority degree.

The present disclosure potentially has at least the following advantages:

1. In cases where a channel carries more important but less data than other channel(s), a part of the schedule period is pre-allocated to it, ensuring the complete transmission or reception of the important data.
2. In cases where a channel has significantly less data than other channel(s), the remaining schedule period (after pre-allocation) is allocated to the channels based on their data sizes, improving efficiency and channel usage.
3. The setting of the minimum time duration as mentioned above ensures that all communications and/or switches are meaningful.

FIG. 1 is a block diagram illustrating an internet of things (IoT) system, in accordance with some example embodiments. The IoT system 100 may include an IoT server 102, a network, such as the Internet 104, an access point 106, an air interface 108, IoT devices 110 and 112, IoT sensors 114 and 116, a mobile device 118, and a monitor device 120.

The IoT server 102 serves as the backbone of the IoT system 100, managing data and coordinating communication among other devices in the IoT system 100. The IoT server 102 collects, processes, transmits data to IoT devices 110 and 112 and IoT sensors 114 and 116, and receives and stores data transmitted from IoT devices 110 and 112 and IoT sensors 114 and 116. It also performs tasks such as device management, data analytics, and security enforcement, ensuring smooth operation, and valuable insights from collected data. For example, the IoT server 102 may receive an instruction from the monitor device 120 via the Internet 104 and follow the instruction to manage the IoT device 110 to perform a specific task.

The Internet 104 is a network that allows devices in the IoT system 100 to communicate and exchange data. The Internet 104 provides a pathway for data to travel from IoT devices 110 and 112 and IoT sensors 114 and 116 to the IoT server 102, and vice versa. The Internet 104 also enables remote management, data analysis, and over-the-air updates to the IoT devices. It should be noted that the internet 104 may be combined with or replaced with other type(s) of network.

The access point 106 serves as a bridge between devices (e.g., IoT devices 110 and 112 and IoT sensors 114 and 116) and the Internet 104. It enables devices to connect to the Internet 104 wirelessly, through e.g., Wi-Fi, and facilitates data transfer between these devices and the IoT server 102.

The air interface 108 refers to the radio frequency spectrum used for wireless communication between the access point 106 and the IoT devices 110 and 112 and IoT sensors 114 and 116. It consists of the standards, protocols, and technologies that define how data is formatted and transmitted wirelessly. For example, the air interface 108 may employ a Wi-Fi network under an IEEE 802.11 standard. Alternatively, or additionally, the air interface 108 may employ a Bluetooth, a ZigBee, a Z-Wave, a LPWAN, a RFID, a NFC, etc.

The IoT devices 110 and 112 are physical devices, such as appliances, machines, or gadgets, that are equipped with the necessary hardware and software to perform specific tasks. They interact with the IoT sensors 114 and 116 and communicate with the IoT server 102 through the access point 106 and the Internet 104.

The IoT sensors 114 and 116 are devices or modules that detect changes in the environment or system and convert these changes into data that can be understood and used by the IoT devices 110 and 112 or the IoT server 102. These sensors can monitor various parameters, like temperature, humidity, pressure, light, motion, or other environmental factors.

The mobile device 118 is a portable device, such as a smartphone or tablet, that can interact with the IoT system. It can be used to monitor, control, or configure the IoT devices 110 and 112 remotely. It communicates with the IoT server 102 over the Internet 104, allowing users to interact with the IoT system 100 from anywhere.

The monitor device 120 is a device specifically designed to observe and display information from the IoT system. This could be a dedicated display showing data collected by the IoT sensors 114 and 116, or it could be a computer used by system administrators to manage the IoT system 100. It provides real-time or historical data visualization, allowing for effective system monitoring and troubleshooting.

In some examples, the IoT devices 110 and 112 may receive multiple communication requests from devices inside or outside the IoT system 100. For example, the IoT devices 110 and 112 can receive a first signal from the AP 106, a second signal from the IoT sensor 114, and a third signal from a projector outside the IoT system 100.

It should be noted the present disclosure is not limited to an IoT system with a WI-FI network under IEEE 802.11 standard. Instead, the present disclosure may be used in any other same or different types of systems with same or different types of network environment. Such application is within the protective scope of the present disclosure.

Figure 2:
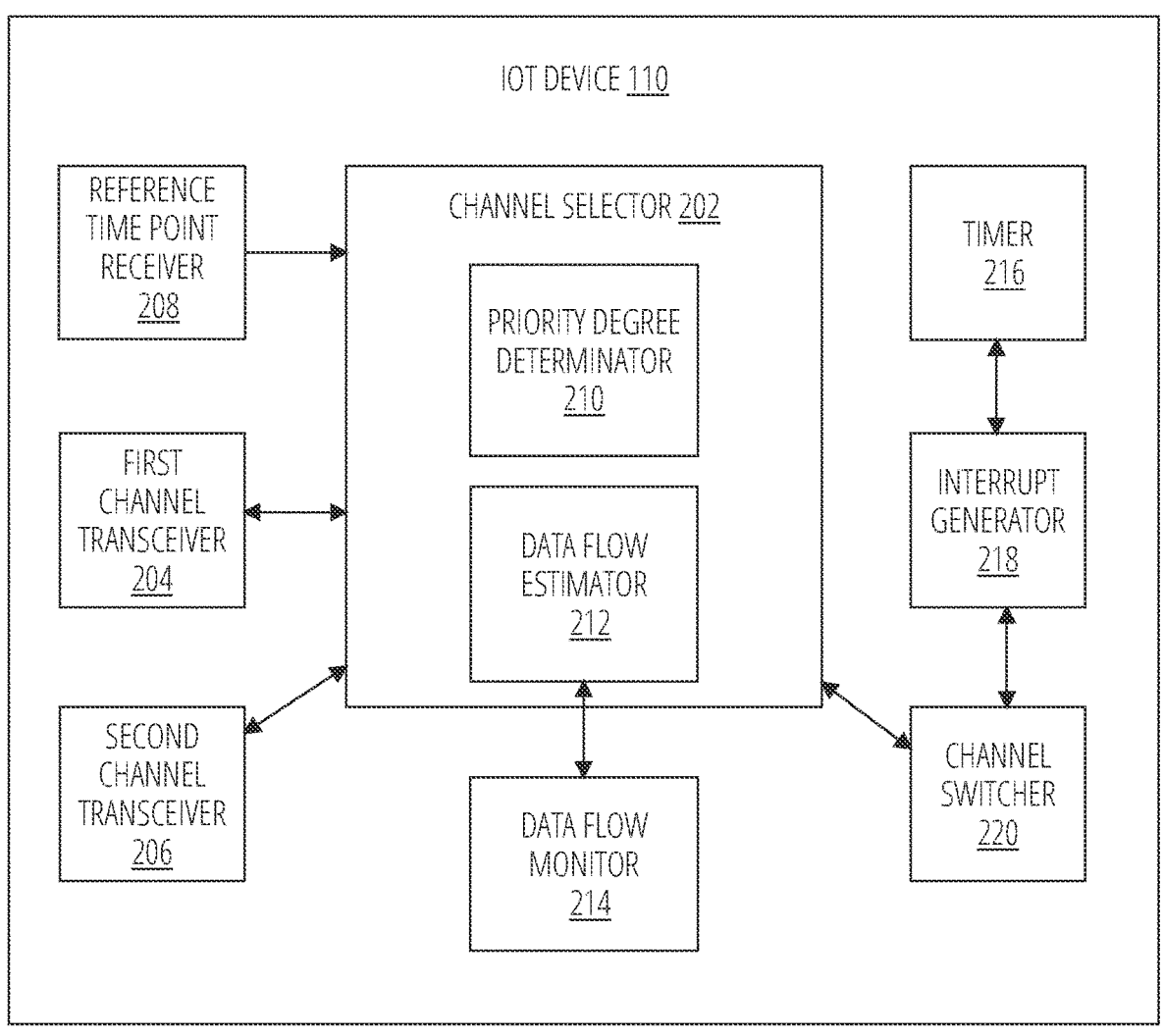
FIG. 2 is a block diagram illustrating an internet of things (IoT) device, in accordance with some example embodiments.

FIG. 2 is a block diagram illustrating an Internet of Things (IoT) device 110, in accordance with some example embodiments. The IoT device 110 may include a channel selector 202, a first channel transceiver 204, a second channel transceiver 206, a reference time point receiver 208, a data flow monitor 214, a timer 216, an interrupt generator 218, a channel switcher 220.

The channel selector 202 may determine a schedule period and allocate the schedule period among multiple channels. The channel remains active during their respective allocated period. The channel selector 202 may include a priority degree determinator 210 and a data flow estimator 212. The priority degree determinator 210 can determine a priority degree of a signal based on the type of communication request contained in the signal.

The data flow estimator 212 is connected to a data flow monitor 214. The data flow monitor 214 tracks the transmission of data within the IoT device 110 or across the IoT system 100. It monitors the rate at which data is transmitted and/or received (also known as the data rate), the size of the data packets, the type of data being transmitted and/or received, the source and destination of the data, and the path that the data takes through the network. The data flow monitor 214 also records the uptime (the duration for which a channel is used) of different channels or signals. By applying predictive analytics or machine learning algorithms to this historical data, the data flow estimator 212 can predict data flow or data size of different channels in the schedule period. For example, the data size may include size of data received and transmitted in the preceding schedule period and size of data ready to be transmitted in the current schedule period. As another example, if a particular signal consistently exhibits high data rates and long uptime during certain periods of the day, the monitor might predict similar performance for the same periods in the future. If the actual data flow or data size differs from the estimation, the data flow estimator 212 may adaptively update the estimation (and/or the algorithms).

The reference time point receiver 208 may receive reference points in the signals. The reference points may include TBTTs of the signals. The reference time points can be used to determine the schedule period.

The first channel transceiver 204 and the second channel transceiver 206 are used to transmit signals to and receive signals from external devices. The first channel transceiver 204 and the second channel transceiver 206 may each include hardware components, such as an encoder, an amplifier, an antenna, a decoder, a control unit, and a power supply. Alternatively, the first channel transceiver 204 and the second channel transceiver 206 may share some or all of the hardware components. In such scenarios, the shared hardware component(s) may be repeatedly configured and used by the first channel transceiver 204 and the second channel transceiver 206 according to the time allocation of the schedule period. In some examples, the first channel transceiver 204 and the second channel transceiver 206 each correspond to a specific radio frequency matched with those of the external devices. Example radio frequencies of the channel transceivers may include 2412 MHz (Channel 1 of 2.4 GHz band Wi-Fi), 2417 MHz (Channel 2 of 2.4 GHz band Wi-Fi), 2422 MHz (Channel 3 of 2.4 GHz band Wi-Fi), 5180 MHz (Channel 36 of 5 GHz band Wi-Fi), 2402 MHz (Channel 1 of Bluetooth), 2405 MHz (Channel 1 of 2.4 GHz band ZigBee), etc.

After allocating a schedule period to the channels, the channel selector 202 may send a control signal to the timer 216 about the allocation. The timer 216 includes an oscillator, a counter, a comparator, a display, a control unit, and a power supply. In some examples, the timer 216 causes the interrupt generator 218 to generate an interrupt when the allocated time duration of a specific channel runs out.

The channel switcher 220 may cause one active channel to be inactive and vice versa. Specifically, the channel switcher 220 can halt or activate the first channel transceiver 204 and/or the second channel transceiver 206. In scenarios where the first channel transceiver 204 and the second channel transceiver 206 share some or all hardware components, the channel switcher 220 may repeatedly configure the shared hardware components based on the required configurations of the active channels. The channel switcher 220 may also send a notification signal to an external device when the corresponding channel becomes inactive/active.

Figure 3A:
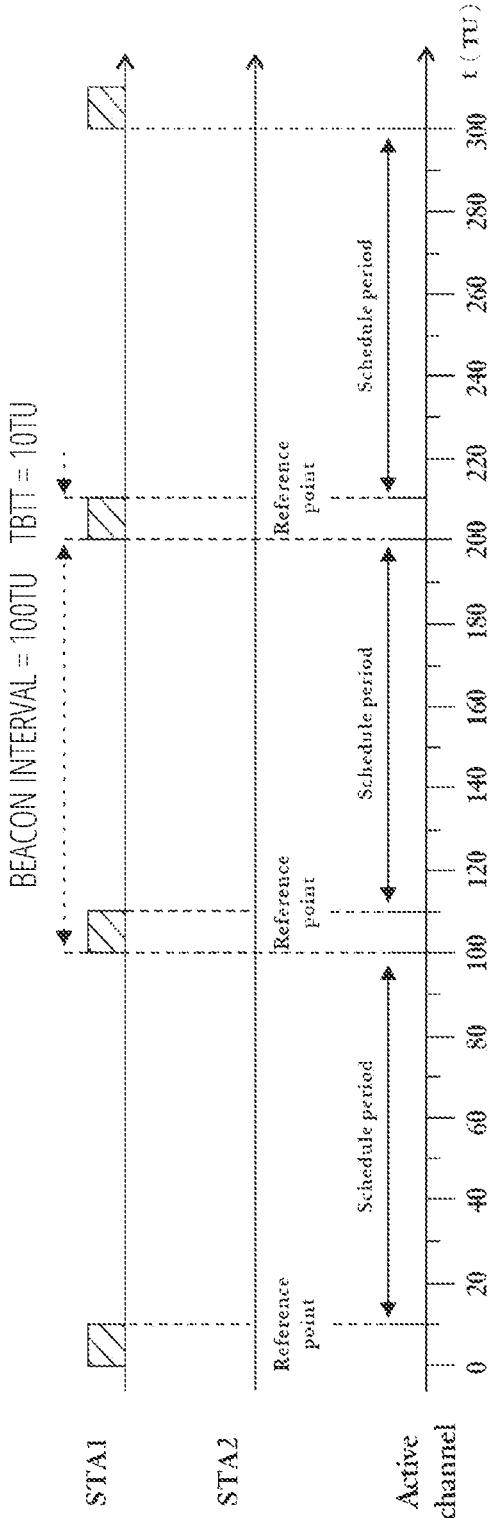
FIGS. 3A-3C are schematic diagrams illustrating determinations of the schedule period, in accordance with some example embodiments.
Figure 3B:
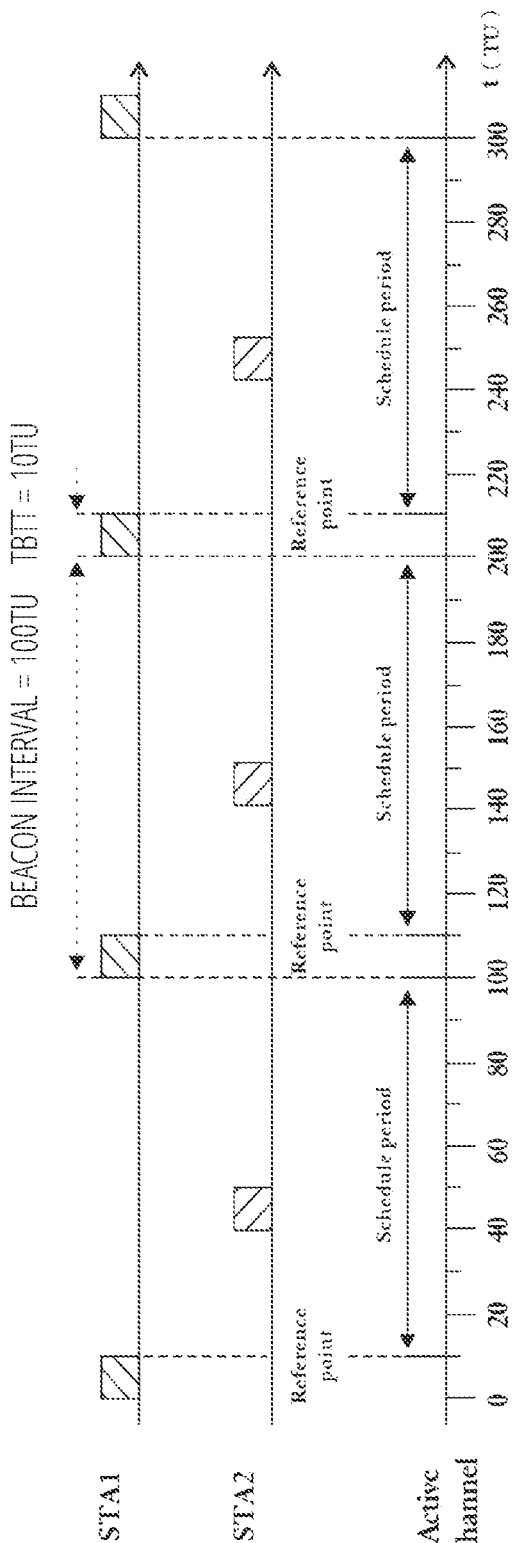
Figure 3C:
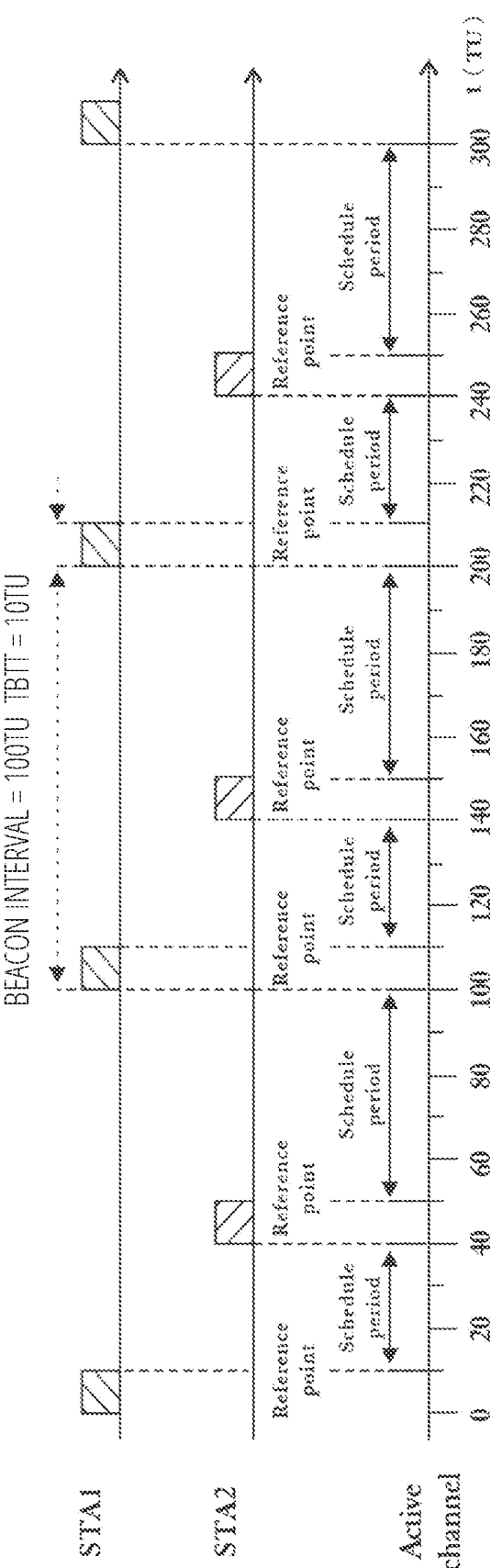

FIGS. 3A-3C are schematic diagrams illustrating determinations of a schedule period, in accordance with some example embodiments. A schedule period is a planned period to be allocated to different channels in the future. The schedule period can be determined based on prior or current communications through the channels. For example, the schedule period is determined by two reference points related to the current signals transmitted through the channels. As shown in FIG. 3A, the IoT device receives periodical signals from a first station ("STA1"). The periodical signals each has a determinable start point (or Target Beacon Transmission Time, TBTT) gapped by a fixed interval (e.g., 100 Time Units (TUs)). A Time Unit is a unit of time used to represent various timing-related parameters, such as interframe spaces, waiting times, or beacon intervals. In some examples, one TU is defined as 1024 microseconds. In other words, the interval between two adjacent TBTTs is 102.4 milliseconds. As mentioned above, the TBTT is a determinable start point of Beacon signals. However, due to air interface congestions or the like, the Beacon signal may be slightly delayed. Accordingly, a time duration (e.g., 10 TUs) after the TBTT may be reserved to ensure that the succeeding Beacon signal is received. Such time duration may not be allocable to the channels and thus not included in a schedule period. Accordingly, the schedule periods are determined as periods between adjacent TBTTs of the periodical signals, excluding the non-allocable time durations. For example, schedule periods are determined to be from T=10 TU to T=100 TU, from T=110 TU to T=200 TU, from T=210 TU to T=300 TU, and so on. Alternatively, considering that the time duration is a Beacon receive window, the schedule period can be determined as periods between adjacent TBTTs, including the time durations after TBTTs. For example, schedule periods are determined to be from T=0 TU to T=100 TU, from T=100 TU to T=200 TU, from T=200 TU to T=300, and so on. Schedule periods in FIGS. 3B and 3C can similarly be determined in these two ways and are not repeated herein. The present disclosure shall protect both scenarios.

As shown in FIGS. 3B and 3C, the IoT device receives first signals from the first station and second signals from the second station. The first signals and the second signals each has a determinable TBTTs. In one example, the IoT device determines the schedule periods as the time durations between adjacent TBTTs of the first signals (or the second signals). For example, the schedule periods are determined to be from T=10 TU to T=100 TU, from T=110 TU to T=200 TU, T=from 210 TU to T=300 TU, and so on. Alternatively, the schedule periods are determined as the time durations between any adjacent TBTTs. For example, schedule periods are determined to be from T=10 TU to T=40 TU, from T=50 TU to T=100 TU, from T=110 TU to T=140 TU, from T=150 TU to T=200 TU, from T=210 TU to T=240 TU, from T=250 TU to T=300 TU, and so on.

It should be noted that the above methods for determining the schedule period are exemplary and not limiting. For example, the two reference points can be any other points besides the TBTTs of the signals transmitted through the channel. To be clear, the reference points can be arbitrary points unrelated to the TBTTs. As another example, part or all of the non-allocable time duration after the TBTTs can be included in the schedule period (i.e., the schedule periods may be continuous).

Figure 4A:
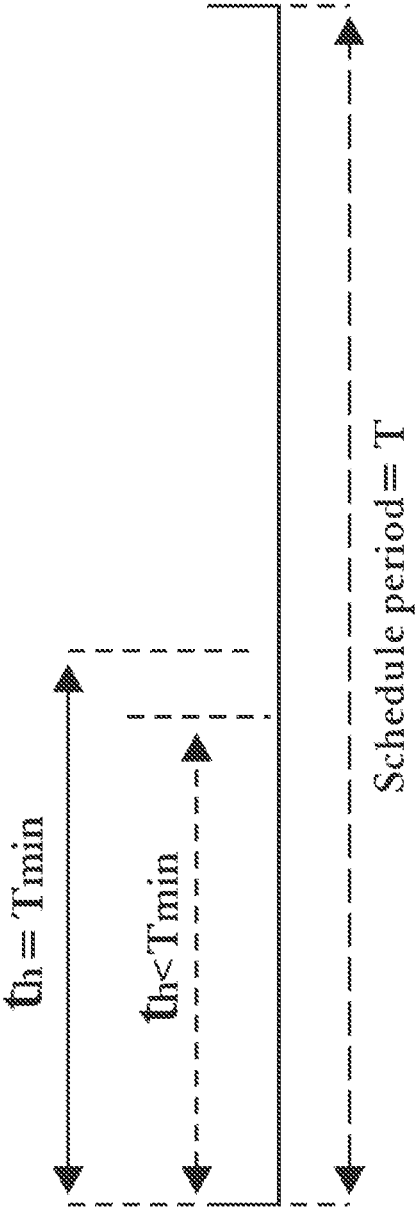
FIGS. 4A-4C are schematic diagrams illustrating allocations of a schedule period, in accordance with some example embodiments.
Figure 4B:
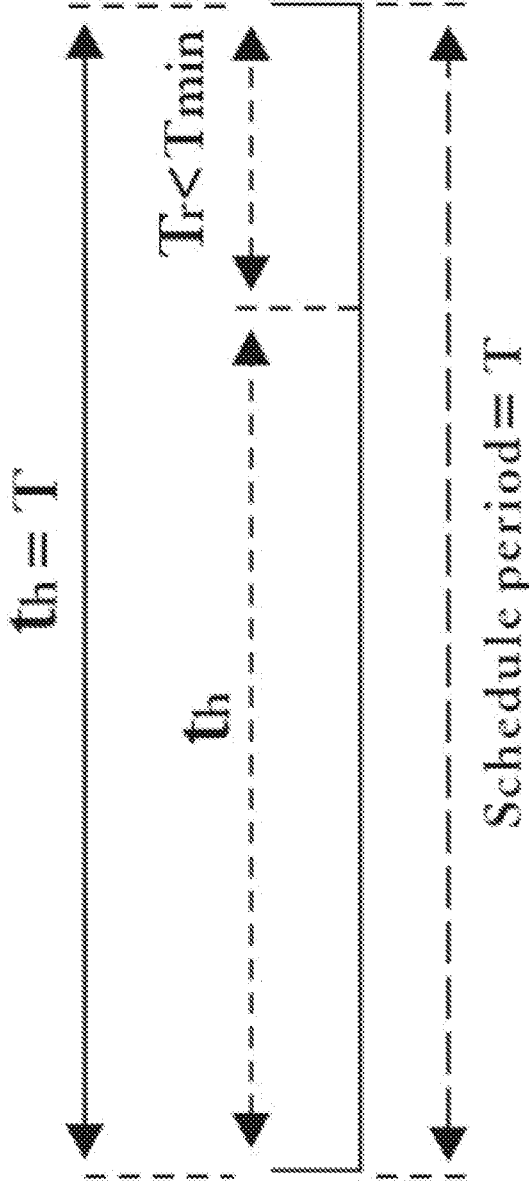
Figure 4C:
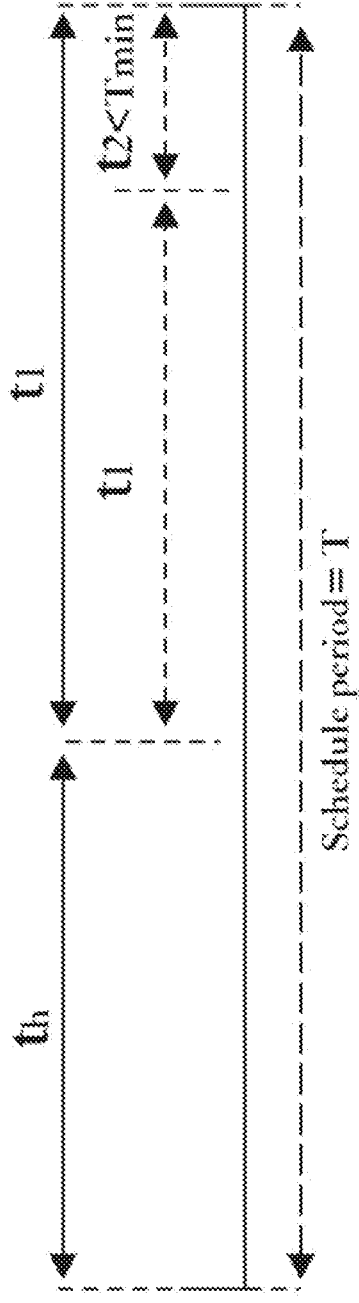

FIGS. 4A-4C are schematic diagrams illustrating allocations of the schedule period, in accordance with some example embodiments. As mentioned above, considering that switching between channels and initiating a communication each requires a certain time duration, a minimum time duration Tmin may be imposed to ensure that each communication or switching is meaningful. Refer to FIG. 4A, $t_h$ is a part of the schedule period pre-allocated to the channel with a higher priority ("high-priority channel"). In cases where $t_h$ is less than Tmin, the IoT device 110 (or IoT device 112) may allocate a time duration equal to Tmin to the high-priority channel to ensure that the important data in the high-priority channel is transmitted or received completely. It should be noted that the schedule period itself should be greater than or equal to the minimum time duration. If not, the schedule period may be redetermined or allocated directly to the channel with higher priority degree or higher data size, the channel in preceding schedule period, or the channel in succeeding schedule period.

Referring to FIG. 4B, the remaining time Tr of the schedule period T after pre-allocation may be less than the minimum time duration Tmin. In such a case, Tr is allocated to the high-priority channel, together with the pre-allocated time period. In other words, the whole schedule period is allocated to the high-priority channel. Alternatively, if the remaining time Tr is less than the minimum time duration Tmin, Tr can be allocated to a channel with the highest data size.

Referring to FIG. 4C, the remaining time period Tr is greater than or equal to the minimum time duration Tmin. In such a case, the Tr is allocated to all the channels based on their data sizes. The data sizes of the channels can be estimated based on the prior and/or current data sizes through the channels in a predetermined period (e.g., a prior schedule period, a fixed period). For example, a first channel has a greater data size than a second channel. Accordingly, the first channel is allocated more time than the second channel (e.g., t1>t2). If the time allocated to the second channel t2 is less than the minimum time duration Tmin, all of the remaining time period Tr is allocated to the first channel. Alternatively, if the time allocated to the second channel t2 is less than the minimum time duration Tmin, the minimum time duration Tmin can be allocated to the second channel.

It should be noted that the above methods for allocating the schedule period are exemplary and not limiting. For example, if the time allocated to the second channel is greater than or equal to the minimum time duration, the remaining time period Tr can be allocated proportionally to the first channel and the second channel based on their respective data sizes. As another example, if all the channels have the same priority degrees, the schedule period can be allocated directly based on the data sizes in the channels.

FIGS. 5-8 are schematic diagrams illustrating allocations of the schedule periods, in accordance with some example embodiments. In some examples, a part of each of the schedule periods can first be allocated to a channel with a higher priority degree. The pre-allocated time period can be a fixed duration or a portion of the schedule period. For example, the pre-allocated time period equals a schedule period multiplied by a factor. The factor may be a predetermined number between 0 and 1. In scenarios when the factor corresponding to a channel with the higher priority degree is 1, the whole schedule period can be pre-allocated to the channel. The factor may be the same or different for channels with different priority degrees.

In some examples, signals (or channels) containing association management frames, such as authentication, association, deauthentication, or disassociation, have a high priority degree. Signals (or channels) containing connection-oriented data frames (CONN), such as Extensible Authentication Protocol over LAN (EAPOL) and Dynamic Host Configuration Protocol (DHCP), have a medium priority degree. Signals (or channels) containing data transmission frames such as Access Categories in Quality of Service (QoS), including Voice (VO), Video (VI), Best Effort (BE), Background (BK), have a low priority degree. In some examples, VO has a higher priority degree than VI, VI has a higher priority degree than BE, and BE has a higher priority degree than BK.

Figure 5:
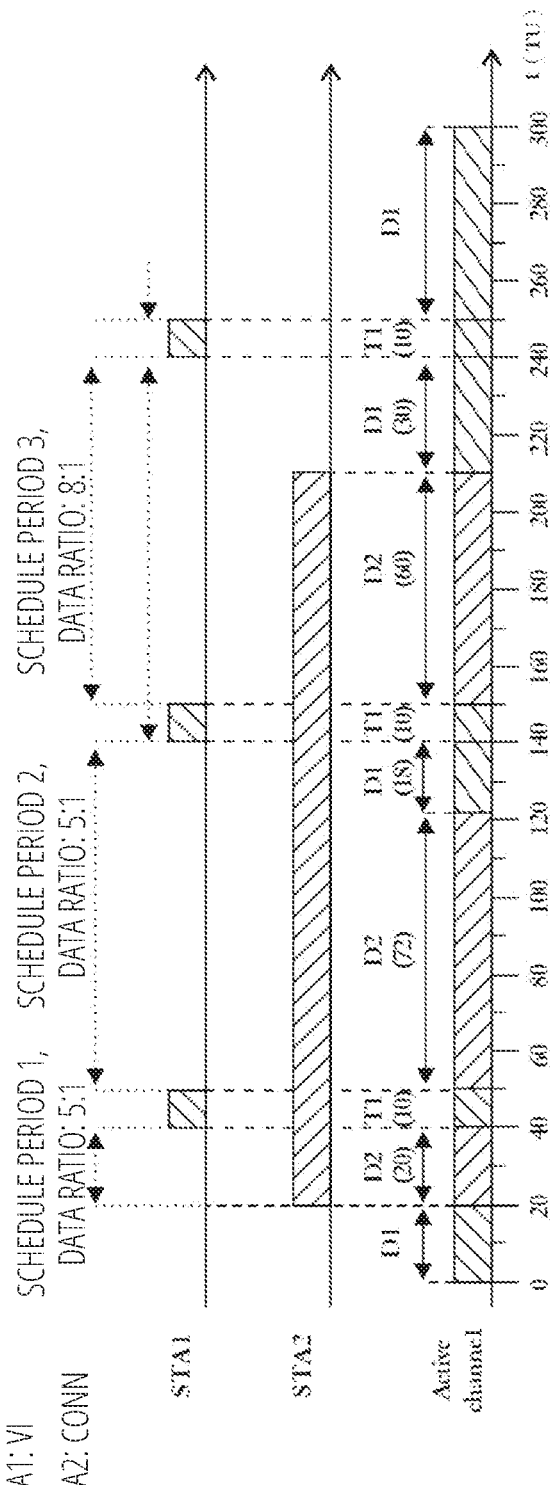
FIGS. 5-8 are schematic diagrams illustrating allocations of the schedule periods, in accordance with some example embodiments.

Referring to FIG. 5, the minimum time duration Tmin is 5 TU. The factor for CONN, VO, VI, BE, and BK is 0.8, 0.6, 0.4, 0.2, and 0, respectively. The priority degree of STA1 is VI and the priority degree of STA2 is CONN. The three schedule periods are determined based on TBTTs of the first signal, such as from T=20 TU to T=40 TU, from T=50 TU to T=140 TU, and from T=150 TU to T=240 TU. It may be noted that each station in FIGS. 5-8 has a consistent priority degree over multiple schedule periods. However, it's merely for the purpose of illustration. Instead, the stations' priority degrees may be updated in each schedule period and the allocations of the schedule periods may be performed based on the updated priority degrees.

In the first schedule period (e.g., from T=20 TU to T=40 TU), STA2 schedule period (0.8*20 TU=16 TU) is pre-allocated to STA2. The remaining time period of the first schedule period after pre-allocation is 4 TU (20 TU–16 TU), which is less than Tmin. Therefore, all of the first schedule period is allocated to STA2.

In the second schedule period (e.g., from T=50 TU to T=140 TU), STA2 has a higher priority degree. Accordingly, a time duration of the second schedule period (0.8*90 TU=72 TU) is pre-allocated to STA2. The remaining time period of the second schedule period after pre-allocation (18 TU (90 TU–72 TU)) is allocated to STA1 and STA2 based on their data sizes or counts of data packets. In this example, the ratio of data sizes is 5:1. Accordingly, 15 TU (18 TU/6*5) is allocated to STA1 and 3 TU (18 TU/6*1) is allocated to STA2. However, 3 TU is less than Tmin. Therefore, all of the remaining 18 TU is allocated to STA1.

In the third schedule period (e.g., from T=150 TU to T=240 TU), STA2 has a higher priority degree. Accordingly, a time duration of the third schedule period (0.8*90 TU=72 TU) is pre-allocated to STA2. The remaining time period of the third schedule period after pre-allocation (18 TU (90 TU–72 TU)) is allocated to STA1 and STA2 based on their data sizes. In this example, the ratio of data sizes is 8:1. Accordingly, 16 TU (18 TU/9*8) is allocated to STA1 and 2 TU (18 TU/9*1) is allocated to STA2. However, 2 TU is less than Tmin. Therefore, all of the remaining 18 TU is allocated to STA1. It is noticed that STA2 finishes its communication at T=210 TU. In such a case, the remaining time period 30 TU (from T=210 TU to T=240 TU) can be allocated to STA1.

Figure 6:
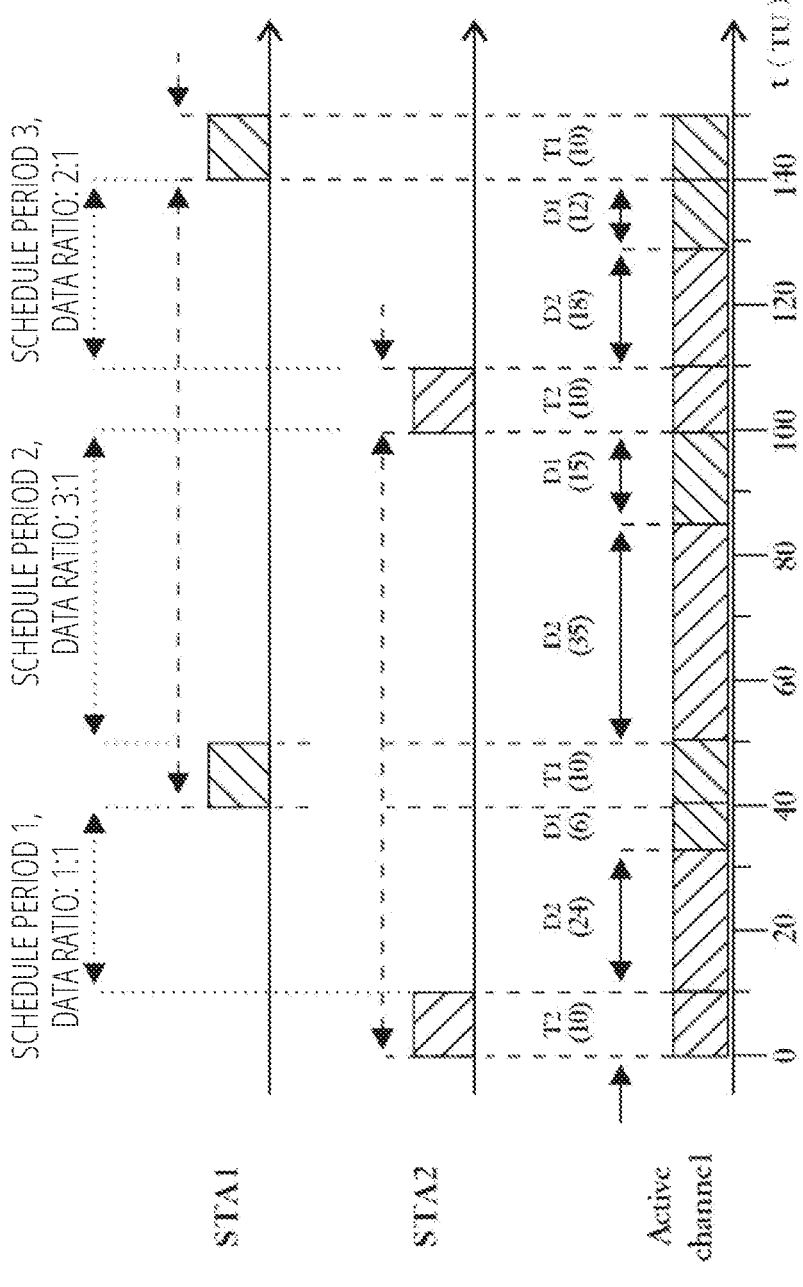

Referring to FIG. 6, the minimum time duration Tmin is 5 TU. The factor for CONN, VO, VI, BE, and BK is 0.8, 0.6, 0.4, 0.2, and 0, respectively. The priority degree of STA1 is BE and the priority degree of STA2 is VO. The three schedule periods are determined based on TBTTs of the first signal and the second signal, such as from T=10 TU to T=40 TU, from T=50 TU to T=100 TU, and from T=110 TU to T=140 TU.

In the first schedule period (e.g., from T=10 TU to T=40 TU), STA2 schedule period (0.6*30 TU=18 TU) is pre-allocated to STA2. The remaining time period of the first schedule period after pre-allocation (12 TU (30 TU–18 TU)) is allocated to STA1 and STA2 based on their data sizes. In this example, the ratio of data sizes is 1:1. Therefore, 12 TU is equally allocated to the STA1 and STA2. Overall, 24 TU (18 TU+6 TU) is allocated to STA2 and 6 TU is allocated to STA1 in the first schedule period.

In the second schedule period (e.g., from T=50 TU to T=100 TU), STA2 has a higher priority degree. Accordingly, a time duration of the second schedule period (0.6*50 TU=30 TU) is pre-allocated to STA2. The remaining time period of the second schedule period after pre-allocation (20 TU (50 TU–30 TU)) is allocated to STA1 and STA2 based on their data sizes. In this example, the ratio of data sizes is 3:1. Accordingly, 15 TU (20 TU/4*3) is allocated to STA1 and 5 TU (20 TU/4*1) is allocated to STA2. Overall, 35 TU (30 TU+5 TU) is allocated to STA2 and 15 TU is allocated to STA1 in the second schedule period.

In the third schedule period (e.g., from T=110 TU to T=140 TU), STA2 has a higher priority degree. Accordingly, a time duration of the third schedule period (0.6*30 TU=18 TU) is pre-allocated to STA2. The remaining time period of the third schedule period after pre-allocation (12 TU (30 TU–18 TU)) is allocated to STA1 and STA2 based on their data sizes. In this example, the ratio of data sizes is 2:1. Accordingly, 8 TU (12 TU/3*2) is allocated to STA1 and 4 TU (12 TU/3*1) is allocated to STA2. However, 4 TU is less than Tmin. Therefore, all of the remaining 12 TU is allocated to STA1. Overall, 18 TU is allocated to STA2 and 12 TU is allocated to STA1 in the third schedule period.

Figure 7:
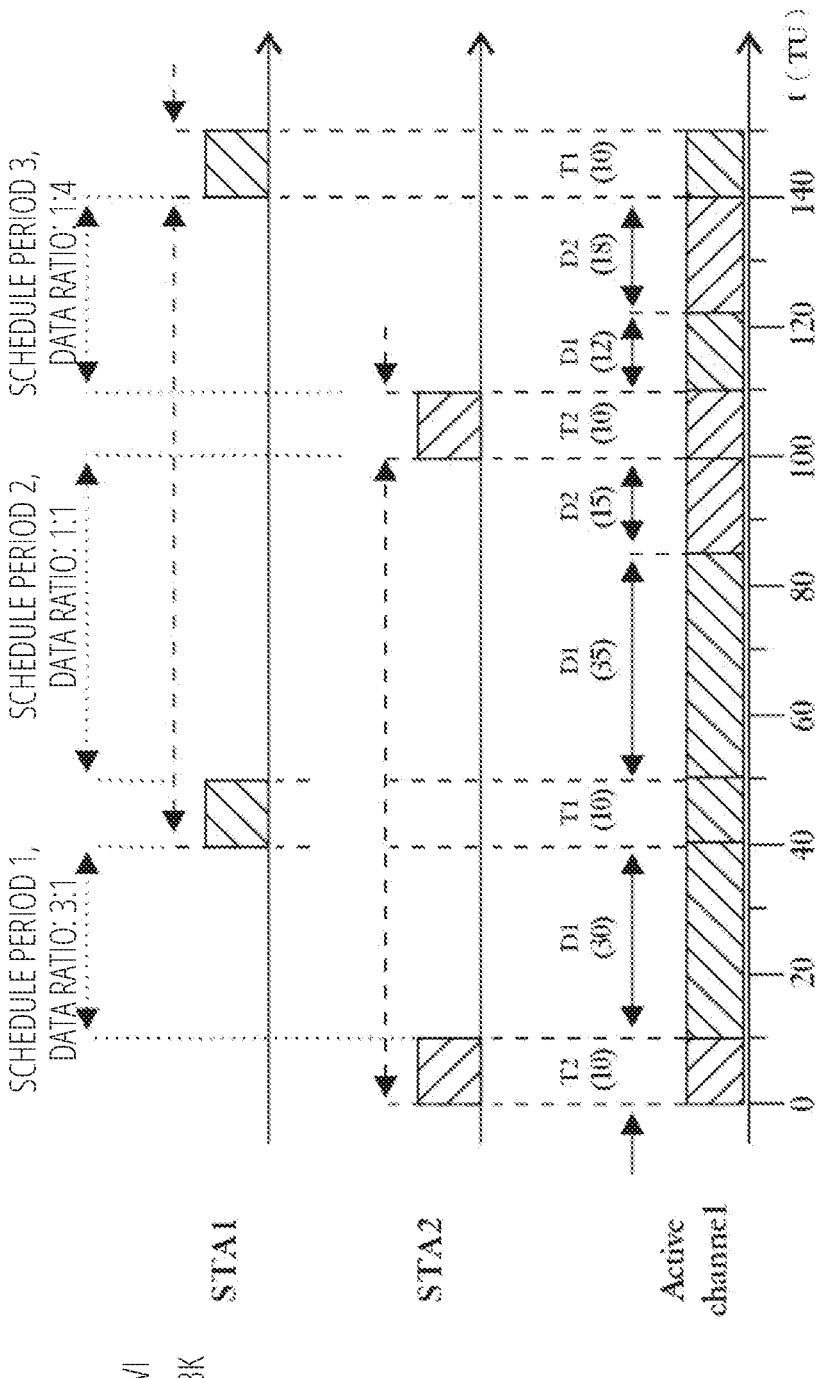

Refer to FIG. 7, the minimum time duration Tmin is 5 TU. The factor for CONN, VO, VI, BE, and BK is 0.8, 0.6, 0.4, 0.2, and 0, respectively. The priority degree of STA1 is VI and the priority degree of STA2 is BK. The three schedule periods are determined based on TBTTs of the first signal and the second signal, such as from T=10 TU to T=40 TU, from T=50 TU to T=100 TU, and from T=110 TU to T=140 TU.

In the first schedule period (e.g., from T=10 TU to T=40 TU), STA1 schedule period (0.4*30 TU=12 TU) is pre-allocated to STA1. The remaining time period of the first schedule period after pre-allocation (18 TU (30 TU-12 TU)) is allocated to STA1 and STA2 based on their data sizes. In this example, the ratio of data sizes is 3:1. Accordingly, 13.5 TU (18 TU/4*3) is allocated to STA1 and 4.5 TU (18 TU/4*1) is allocated to STA2. However, 4.5 TU is less than Tmin. Therefore, all of the remaining time period 18 TU is allocated to STA1. Overall, all of the first schedule period is allocated to STA1.

In the second schedule period (e.g., from T=50 TU to T=100 TU), STA1 has a higher priority degree. Accordingly, a time duration of the second schedule period (0.4*50 TU=20 TU) is pre-allocated to STA1. The remaining time period of the second schedule period after pre-allocation (30 TU (50 TU–20 TU)) is allocated to STA1 and STA2 based on their data sizes. In this example, the ratio of data sizes is 1:1. Accordingly, 30 TU is equally allocated to STA1 and STA2. Overall, 35 TU (20 TU+15 TU) is allocated to STA1 and 15 TU is allocated to STA2.

In the third schedule period (e.g., from T=110 TU to T=140 TU), STA1 has a higher priority degree. Accordingly, a time duration of the third schedule period (0.4*30 TU=12 TU) is pre-allocated to STA1. The remaining time period of the third schedule period after pre-allocation is 18 TU (30 TU–12 TU). The remaining time period is allocated to STA1 and STA2 based on their data sizes. In this example, the ratio of data sizes is 1:4. Accordingly, 3.6 TU (18 TU/5*1) is allocated to STA1 and 14.4 TU (18 TU/5*4) is allocated to STA2. However, 3.6 TU is less than Tmin. Therefore, all of the remaining 18 TU is allocated to STA2. Overall, 12 TU is allocated to STA1 and 18 TU is allocated to STA2 in the third schedule period.

Figure 8:
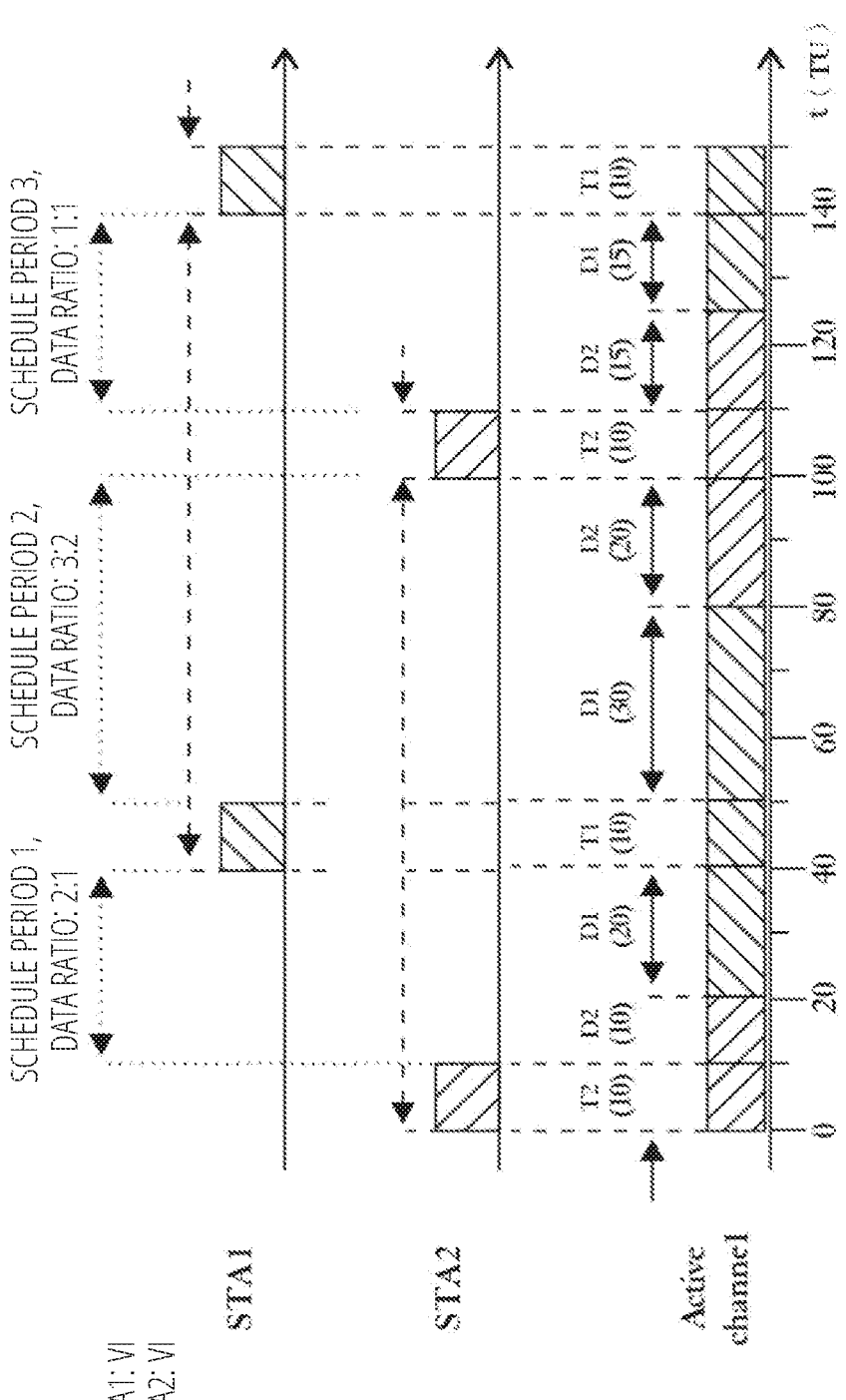

Referring to FIG. 8, the minimum time duration Tmin is 5 TU. The priority degrees of STA1 and STA2 are the same (e.g., VI). The three schedule periods are determined based on TBTTs of the first signal and the second signal, such as from T=10 TU to T=40 TU, from T=50 TU to T=100 TU, and from T=110 TU to T=140 TU. Because STA1 and STA2 has the same priority degree, no time duration is pre-allocated. Instead, the schedule period is directly allocated to the channels based on their data sizes.

In the first schedule period (e.g., from T=10 TU to T=40 TU), the ratio of data sizes is 2:1. Accordingly, 20 TU (30 TU/3*2) is allocated to STA1 and 10 TU (30 TU/3*1) is allocated to STA2. Considering that STA2 is in operation at T=10 TU, the first part (10 TU) of the first schedule period may be allocated to STA2 to reduce unnecessary switches. The remaining 20 TU is allocated to STA1. In some examples, when a schedule period is allocated to multiple stations, the order of the allocation can be adjusted to reduce unnecessary switches. For example, the first part of the schedule period can be allocated to the last channel in the preceding schedule period. The last part of the schedule period can be allocated to the first channel in the succeeding schedule period (if it has been determined).

In the second schedule period (e.g., from T=50 TU to T=100 TU), the ratio of data sizes is 3:2. Accordingly, 30 TU (50 TU/5*3) is allocated to STA1 and 20 TU (50 TU/5*2) is allocated to STA2. Similarly, the first part (30 TU) is allocated to STA1 to reduce unnecessary switches. The remaining 20 TU is allocated to STA2.

In the third schedule period (e.g., from T=110 TU to T=140 TU), the ratio of data sizes is 1:1. Accordingly, the 30 TU is equally allocated to the STA1 and the STA2. To reduce unnecessary switches, the first half of the third schedule period 15 TU is allocated to STA2 and the second half of the third schedule period 15 TU is allocated to STA1.

It should be noted that although the above examples have two channels, methods in the present disclosure can be used in allocating the schedule period among more than two channels. Such application is also within the protection scope of the present disclosure. In cases where three or more channels are present, the schedule period may be pre-allocated more than once, in the descending order of the priority degrees of the channels. Alternatively, only the channel with the highest priority degree is pre-allocated a time duration. The remaining time duration of the schedule period is directly allocated among all the channels based on their data sizes.

Figure 9:
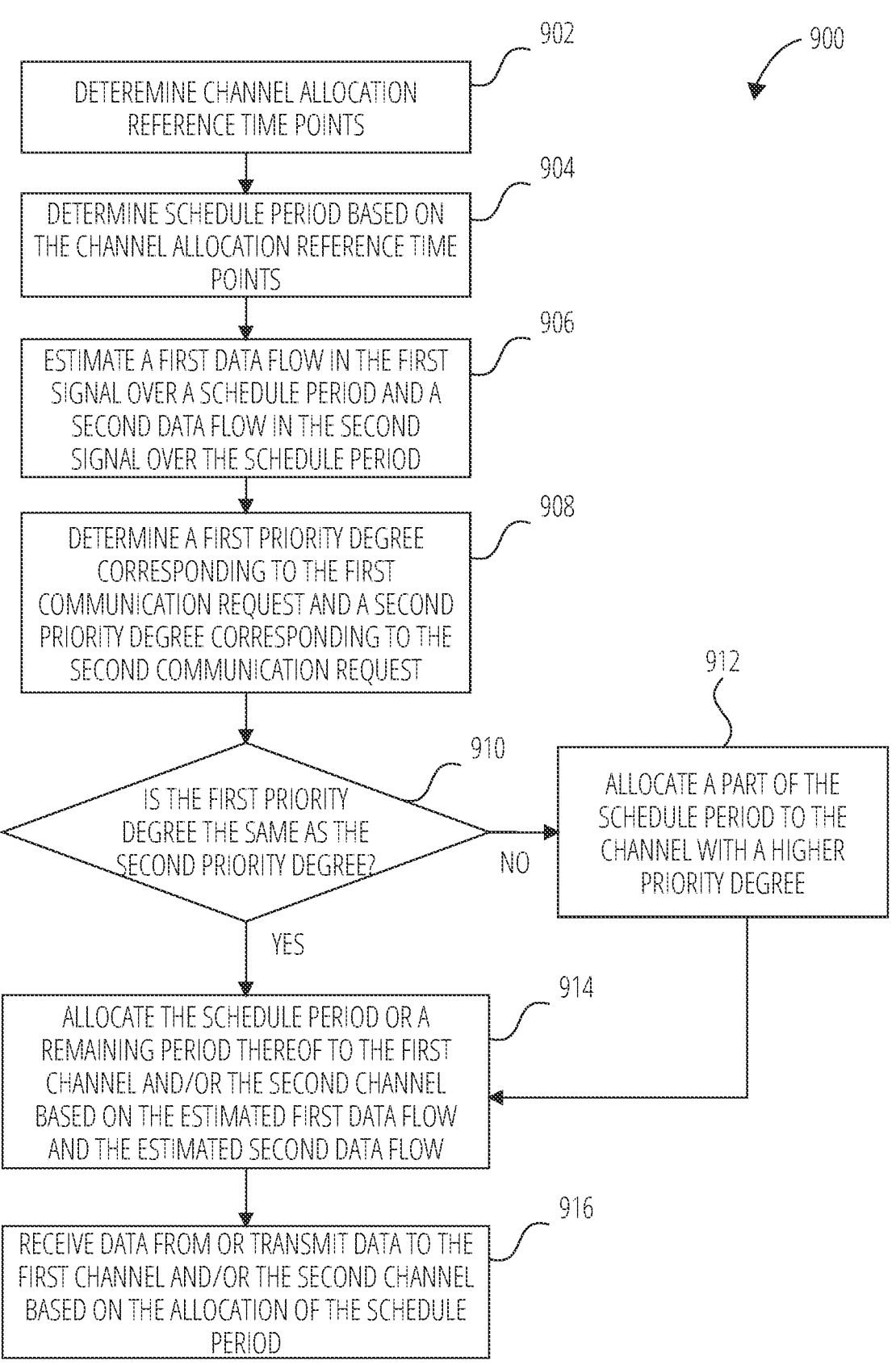
FIG. 9 is a flowchart illustrating operations of the IoT device in allocating a schedule period between two channels, in accordance with some example embodiments.

FIG. 9 is a flowchart illustrating operations of the IoT device in allocating a schedule period between two channels, in accordance with some example embodiments. The method 900 may be embodied in computer-readable instructions for execution by one or more processors such that operations of the method 900 may be performed in part or in whole by the functional components of the IoT device 110 (or IoT device 112); accordingly, the method 900 is described below by way of example with reference thereto. However, it shall be appreciated that at least some of the operations of the method 900 may be deployed on various other hardware configurations than the IoT device 110. Also, the operations of the method 900 may be partially omitted, or performed in any order. Method 900 uses two channels (and two signals) as an example but it shall not be limiting. A schedule period can be allocated to more channels based on the method 900.

In operation 902, the IoT device 110 may determine channel allocation reference time points. The channel allocation reference time points are reference points used to determine schedule period(s). In some examples, the channel allocation reference time points include TBTTs of one or more signals transmitted or received through channels.

In operation 904, the IoT device 110 may determine schedule period(s) based on the channel allocation reference time points. In some examples, the schedule period(s) are time durations between two TBTTs of the same or different signals.

In operation 906, the IoT device 110 may estimate data flow in the signals. For example, the IoT device 110 estimates a first data flow in a first signal and the second data flow in a second signal over the schedule period based on a prior and/or current data flow. As used herein, data flow and data size are interconvertible. For example, data size equals the data flow multiplied by an estimated communication time.

In operation 908, the IoT device 100 may determine a first priority degree corresponding to a first communication request in the first signal and a second priority degree corresponding to a second communication request in the second signal. The priority degree can be determined based on the type of tasks in the communication request. In some examples, signals (or channels) containing association management frames, such as authentication, association, deauthentication, or disassociation, have a high priority degree. Signals (or channels) containing connection-oriented data frames (CONN), such as Extensible Authentication Protocol over LAN (EAPOL) and Dynamic Host Configuration Protocol (DHCP), have a medium priority degree. Signals (or channels) containing data transmission frames, such as Access Categories in Quality of Service (QOS), including Voice (VO), Video (VI), Best Effort (BE), Background (BK), have a low priority degree. In some examples, VO has a higher priority degree than VI, VI has a higher priority degree than BE, and BE has a higher priority degree than BK.

In operation 910, the IoT device 110 may determine whether the first priority degree is the same as the second priority degree. In response to a determination that the first priority degree is not the same as the second priority degree, the method 900 proceeds to operation 912; otherwise, the method 900 proceeds to operation 914.

In operation 912, the IoT device 110 may allocate a part of the schedule period to the channel with a higher priority degree. The pre-allocated time period can be a fixed duration or a portion of the schedule period. For example, the pre-allocated time period equals a schedule period multiplied by a factor. The factor may be the same or different for channels with different priority degrees.

In operation 914, the IoT device 110 may allocate the schedule period or a remaining period of the schedule period (after pre-allocation) to the first channel and/or the second channel based on the estimated first data flow (or first data size) and the estimated second data flow (or second data size). For example, the data size may include size of data received and transmitted in the preceding schedule period and size of data ready to be transmitted in the current schedule period.

In operation 916, the IoT device 110 may receive data from or transmit data to the first channel and/or the second channel based on the allocation of the schedule period.

Examples

1. A method, comprising:
  receiving a first signal from a first device, through a first channel of an IoT device, the first signal comprising a first communication request;
  receiving a second signal from a second device, through a second channel of the IoT device, the second signal comprising a second communication request;
  determining a first priority degree corresponding to the first communication request and a second priority degree corresponding to the second communication request;
  estimating a first data flow in the first signal over a schedule period and a second data flow in the second signal over the schedule period;
  allocating the schedule period to the first channel and the second channel based on the first priority degree, the second priority degree, the estimated first data flow, and the estimated second data flow; and
  receiving data from or transmitting data to the first channel and the second channel based on the allocation of the schedule period.

2. The method of example 1, wherein the first priority degree is higher than the second priority degree, and the allocating of the schedule period to the first channel and the second channel comprises:

allocating at least a portion of the schedule period to the first channel.

3. The method of example 2, further comprising:

determining whether a remaining time period of the schedule period is greater than a predetermined threshold after allocating the at least a portion of the schedule period to the first channel; and in response to determining that the remaining time period of the schedule period is greater than the predetermined threshold, allocating the remaining time period to the first channel and the second channel based on the estimated first data flow and the estimated second data flow.

4. The method of example 3, wherein a ratio between a first duration over the remaining time period allocated to the first channel and a second duration over the remaining time period allocated to the second channel is proportional to a ratio between the estimated first data flow and the estimated second data flow or a ratio between an estimated first count of data packets through the first channel and an estimated second count of data packets through the second channel.

5. The method of any one of examples 3-4, wherein in response to determining that a remaining time period of the schedule period is not greater than the predetermined threshold, the method further comprises:

allocating the remaining time period to the first channel.

6. The method of any one of examples 1-5, wherein the schedule period is a time period between two channel allocation reference time points.

7. The method of example 6, wherein the two channel allocation reference time points each is either a Target Beacon Transmission Time (TBTT) of the first signal or a TBTT of the second signal.

8. The method of any one of examples 1-7, wherein the first data flow in the first signal over the schedule period is estimated based on a size of data received and transmitted in a preceding schedule period through the first channel and a size of data ready to be transmitted in the schedule period through the first channel; and the second data flow in the second signal over the schedule period is estimated based on a size of data received and transmitted in the preceding schedule period through the second channel and a size of data ready to be transmitted in the schedule period through the second channel.

9. The method of any one of examples 1-8, wherein the determining of the first priority degree corresponding to the first communication request and the second priority degree corresponding to the second communication request comprises:

identifying a first communication task in the first communication request and a second communication task in the second communication request; and determining the first priority degree and the second priority degree based on types of the first communication task and the second communication task.

10. The method of example 9, wherein the types of the first communication task and the second communication task include a management of connection, data of connection, or data transmission, and a priority degree corresponding to the management of connection is higher than a priority degree corresponding to the data of connection and the priority degree corresponding to the data of connection is higher than a priority degree corresponding to the data transmission.

11. An IoT device comprising:

a processor; and a memory storing instructions that, when executed by the processor, configure the IoT device to:

receive a first signal from a first device through a first channel of the IoT device, the first signal comprising a first communication request;

receive a second signal from a second device through a second channel of the IoT device, the second signal comprising a second communication request;

determine a first priority degree corresponding to the first communication request and a second priority degree corresponding to the second communication request;

estimate a first data flow in the first signal over a schedule period and a second data flow in the second signal over the schedule period;

allocate the schedule period to the first channel and the second channel based on the first priority degree, the second priority degree, the estimated first data flow, and the estimated second data flow; and receive data from or transmit data to the first channel and the second channel based on the allocation of the schedule period.

12. The IoT device of example 11, wherein the first priority degree is higher than the second priority degree, and the communication schedule comprises:

allocate at least a portion of the schedule period to the first channel.

13. The IoT device of example 12, wherein the instructions further configure the IoT device to:

determine whether a remaining time period of the schedule period is greater than a predetermined threshold after allocating the at least a portion of the schedule period to the first channel; and in response to determining that the remaining time period of the schedule period is greater than the predetermined threshold, allocate the remaining time period to the first channel and the second channel based on the estimated first data flow and the estimated second data flow.

14. The IoT device of example 13, wherein a ratio between time over the remaining time period allocated to the first channel and time over the remaining time period allocated to the second channel is proportional to a ratio between the estimated first data flow and the estimated second data flow or a ratio between an estimated first count of data packets through the first channel and an estimated second count of data packets through the second channel.

15. The IoT device of any one of examples 13-14, wherein in response to determining that a remaining time period of the schedule period is not greater than the predetermined threshold, the instructions further configure the IoT device to:

allocate the remaining time period to the first channel.

16. The IoT device of any one of examples 11-15, wherein the schedule period is a time period between two channel allocation reference time points.

17. The IoT device of example 16, wherein the two channel allocation reference time points each is either a Target Beacon Transmission Time (TBTT) of the first signal or a TBTT of the second signal.

18. The IoT device of any one of examples 11-17, wherein the first data flow in the first signal over the schedule period is estimated based on a size of data received and transmitted in a preceding schedule period through the first channel and a size of data ready to be transmitted in the schedule period through the first channel, and the second data flow in the second signal over the schedule period is estimated based on a size of data received and transmitted in the preceding schedule period through the second channel and a size of data ready to be transmitted in the schedule period through the second channel.

19. The IoT device of any one of examples 11-18, wherein to determine the first priority degree corresponding to the first communication request and the second priority degree corresponding to the second communication request, the instructions further configure the IoT device to:

identify a first communication task in the first communication request and a second communication task in the second communication request; and determine the first priority degree and the second priority degree based on types of the first communication task and the second communication task.

20. A non-transitory computer-readable storage medium, the computer-readable storage medium including instructions that when executed by a computer, cause the computer to:

receive a first signal from a first device through a first channel of an IoT device, the first signal comprising a first communication request;

receive a second signal from a second device through a second channel of the IoT device, the second signal comprising a second communication request;

determine a first priority degree corresponding to the first communication request and a second priority degree corresponding to the second communication request;

estimate a first data flow in the first signal over a schedule period and a second data flow in the second signal over the schedule period;

allocate the schedule period to the first channel and the second channel based on the first priority degree, the second priority degree, the estimated first data flow, and the estimated second data flow; and receive data from or transmit data to the first channel and the second channel based on the allocation of the schedule period.

CONCLUSION

The present disclosure provides system and methods for efficiently allocating the schedule period among multiple channels. Firstly, at least a part of the schedule period is pre-allocated (or reserved) for channels with a higher priority degree. The remaining time of the schedule period is then allocated among all the channels based on their estimated data sizes. A minimum time duration is also imposed on each channels before and/or after switching to ensure that each communication or switching is meaningful. The present disclosure potentially has at least the following advantages: 1. In cases where a channel carries more important but small data than other channel(s), a part of the schedule period is pre-allocated to it, ensuring the complete transmission or reception of the important data. 2. In cases where a channel has significantly smaller data than other channel(s), the remaining schedule period (after pre-allocation) is allocated to the channels based on their data sizes, improving efficiency and channel usage. 3. The setting of the minimum time duration ensures that all communications and/or switches are meaningful.

What is claimed is:

1. A method, comprising:

receiving a first signal from a first device through a first channel of an IoT device, the first signal comprising a first communication request;

receiving a second signal from a second device through a second channel of the IoT device, the second signal comprising a second communication request;

determining a first priority degree corresponding to the first communication request and a second priority degree corresponding to the second communication request;

estimating a first data flow in the first signal over a schedule period and a second data flow in the second signal over the schedule period;

allocating the schedule period to the first channel and the second channel based on the first priority degree, the second priority degree, the estimated first data flow, and the estimated second data flow; and receiving data from or transmitting data to the first channel and the second channel based on the allocation of the schedule period, wherein the first priority degree is higher than the second priority degree, and the allocating of the schedule period to the first channel and the second channel comprises:

allocating at least a portion of the schedule period to the first channel;

determining whether a remaining time period of the schedule period is greater than a predetermined threshold after allocating the at least a portion of the schedule period to the first channel; and in response to determining that the remaining time period of the schedule period is greater than the predetermined threshold, allocating the remaining time period to the first channel and the second channel based on the estimated first data flow and the estimated second data flow.

2. The method of claim 1, wherein a ratio between a first duration over the remaining time period allocated to the first channel and a second duration over the remaining time period allocated to the second channel is proportional to a ratio between the estimated first data flow and the estimated second data flow or a ratio between an estimated first count of data packets through the first channel and an estimated second count of data packets through the second channel.

3. The method of claim 1, wherein in response to determining that a remaining time period of the schedule period is not greater than the predetermined threshold, the method further comprises:

allocating the remaining time period to the first channel.

4. The method of claim 1, wherein the schedule period is a time period between two channel allocation reference time points.

5. The method of claim 4, wherein the two channel allocation reference time points each is either a Target Beacon Transmission Time (TBTT) of the first signal or a TBTT of the second signal.

6. The method of claim 1, wherein the first data flow in the first signal over the schedule period is estimated based on a size of data received and transmitted in a preceding schedule period through the first channel and a size of data ready to be transmitted in the schedule period through the first channel, and the second data flow in the second signal over the schedule period is estimated based on a size of data received and transmitted in the preceding schedule period through the second channel and a size of data ready to be transmitted in the schedule period through the second channel.

7. The method of claim 1, wherein the determining of the first priority degree corresponding to the first communication request and the second priority degree corresponding to the second communication request comprises:

identifying a first communication task in the first communication request and a second communication task in the second communication request; and determining the first priority degree and the second priority degree based on types of the first communication task and the second communication task.

8. The method of claim 7, wherein the types of the first communication task and the second communication task include a management of connection, data of connection, or data transmission, and a priority degree corresponding to the management of connection is higher than a priority degree corresponding to the data of connection and the priority degree corresponding to the data of connection is higher than a priority degree corresponding to the data transmission.

9. An IoT device comprising:

a processor; and a memory storing instructions that, when executed by the processor, configure the IoT device to:

receive a first signal from a first device through a first channel of the IoT device, the first signal comprising a first communication request;

receive a second signal from a second device through a second channel of the IoT device, the second signal comprising a second communication request;

determine a first priority degree corresponding to the first communication request and a second priority degree corresponding to the second communication request;

estimate a first data flow in the first signal over a schedule period and a second data flow in the second signal over the schedule period;

allocate the schedule period to the first channel and the second channel based on the first priority degree, the second priority degree, the estimated first data flow, and the estimated second data flow; and receive data from or transmit data to the first channel and the second channel based on the allocation of the schedule period, wherein the first data flow in the first signal over the schedule period is estimated based on a size of data received and transmitted in a preceding schedule period through the first channel and a size of data ready to be transmitted in the schedule period through the first channel, wherein the second data flow in the second signal over the schedule period is estimated based on a size of data received and transmitted in the preceding schedule period through the second channel and a size of data ready to be transmitted in the schedule period through the second channel.

10. The IoT device of claim 9, wherein the first priority degree is higher than the second priority degree, and the communication schedule comprises:

allocate at least a portion of the schedule period to the first channel.

11. The IoT device of claim 10, wherein the instructions further configure the IoT device to:

determine whether a remaining time period of the schedule period is greater than a predetermined threshold after allocating the at least a portion of the schedule period to the first channel; and in response to determining that the remaining time period of the schedule period is greater than the predetermined threshold, allocate the remaining time period to the first channel and the second channel based on the estimated first data flow and the estimated second data flow.

12. The IoT device of claim 11, wherein a ratio between time over the remaining time period allocated to the first channel and time over the remaining time period allocated to the second channel is proportional to a ratio between the estimated first data flow and the estimated second data flow or a ratio between an estimated first count of data packets through the first channel and an estimated second count of data packets through the second channel.

13. The IoT device of claim 11, wherein in response to determining that a remaining time period of the schedule period is not greater than the predetermined threshold, the instructions further configure the IoT device to:

allocate the remaining time period to the first channel.

14. The IoT device of claim 9, wherein the schedule period is a time period between two channel allocation reference time points.

15. The IoT device of claim 14, wherein the two channel allocation reference time points each is either a Target Beacon Transmission Time (TBTT) of the first signal or a TBTT of the second signal.

16. The IoT device of claim 9, wherein to determine the first priority degree corresponding to the first communication request and the second priority degree corresponding to the second communication request, the instructions further configure the IoT device to:

identify a first communication task in the first communication request and a second communication task in the second communication request; and determine the first priority degree and the second priority degree based on types of the first communication task and the second communication task.

17. A non-transitory computer-readable storage medium, the computer-readable storage medium including instructions that when executed by a computer, cause the computer to:

receive a first signal from a first device through a first channel of an IoT device, the first signal comprising a first communication request;

receive a second signal from a second device through a second channel of the IoT device, the second signal comprising a second communication request;

determine a first priority degree corresponding to the first communication request and a second priority degree corresponding to the second communication request;

estimate a first data flow in the first signal over a schedule period and a second data flow in the second signal over the schedule period;

allocate the schedule period to the first channel and the second channel based on the first priority degree, the second priority degree, the estimated first data flow, and the estimated second data flow; and receive data from or transmit data to the first channel and the second channel based on the allocation of the schedule period, wherein to determine the first priority degree corresponding to the first communication request and the second priority degree corresponding to the second communication request, the instructions further cause the computer to:

identify a first communication task in the first communication request and a second communication task in the second communication request; and determine the first priority degree and the second priority degree based on types of the first communication task and the second communication task.

* * * * *